United States Patent [19]

Altland et al.

[11] Patent Number: 4,847,602
[45] Date of Patent: Jul. 11, 1989

[54] EXPLOSION-PROTECTED COMPUTER TERMINAL

[75] Inventors: David J. Altland, Wellsville; Wojciech R. Wyczalkowski, Middletown, both of Pa.

[73] Assignee: HMW Enterprises, Inc., Etters, Pa.

[21] Appl. No.: 789,244

[22] Filed: Oct. 18, 1985

[51] Int. Cl.⁴ .............................................. G09G 1/00
[52] U.S. Cl. ................... 340/700; 340/720; 358/100; 358/245
[58] Field of Search ................ 340/700, 720, 365 A, 340/711; 358/245, 247, 100

[56] References Cited

U.S. PATENT DOCUMENTS

| | | | |
|---|---|---|---|
| 3,383,487 | 5/1968 | Wiener . | |
| 3,499,113 | 3/1970 | Rymes | 358/247 |
| 3,925,776 | 12/1975 | Swallow | 340/717 |
| 4,066,853 | 1/1978 | Zenk . | |
| 4,072,929 | 2/1978 | Garmong | 340/825.31 |
| 4,228,330 | 10/1980 | Larson | 200/5 A |
| 4,296,406 | 10/1981 | Pearson . | |
| 4,339,634 | 7/1982 | Weber . | |
| 4,468,702 | 8/1984 | Jandrell | 358/245 |
| 4,529,905 | 7/1985 | Ohkoshi et al. | 358/245 |
| 4,539,655 | 9/1985 | Trussel et al. | 340/825.01 |
| 4,618,797 | 10/1986 | Cline | 340/365 A |

FOREIGN PATENT DOCUMENTS

WO81/02223  8/1981  PCT Int'l Appl. .

Primary Examiner—Gerald L. Brigance
Assistant Examiner—Jeffery A. Brier
Attorney, Agent, or Firm—Sughrue, Mion, Zinn, Macpeak & Seas

[57] ABSTRACT

A computer terminal including a cathode ray tube display in an explosion-protected electrically grounded enclosure. The front wall of the enclosure is formed by a hermetically sealed keypanel having an electrically conductive window located opposite the display for discharging, without sparking, static electricity to the grounded enclosure. The keypanel is formed from a rigid metal plate containing a pattern of several apertures in which the mounted pressure-sensitive piezoelectric switches which serve as data key input devices. A deformable metal sheet covers the rigid metal plate and apertures and has defined therein pressure points opposite corresponding apertures. The rigidity of the metal plate is sufficient to prevent pressure applied to one pressure point from affecting a switch at any other pressure point.

4 Claims, 3 Drawing Sheets

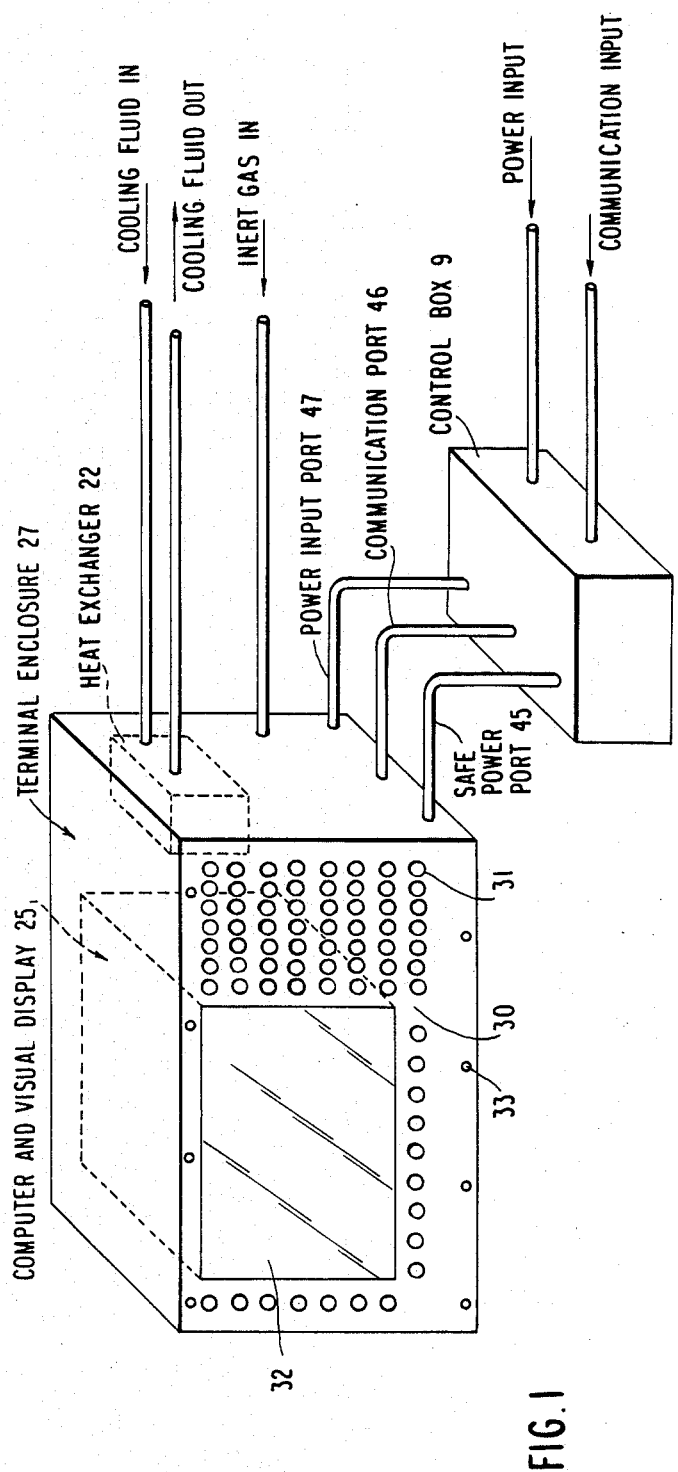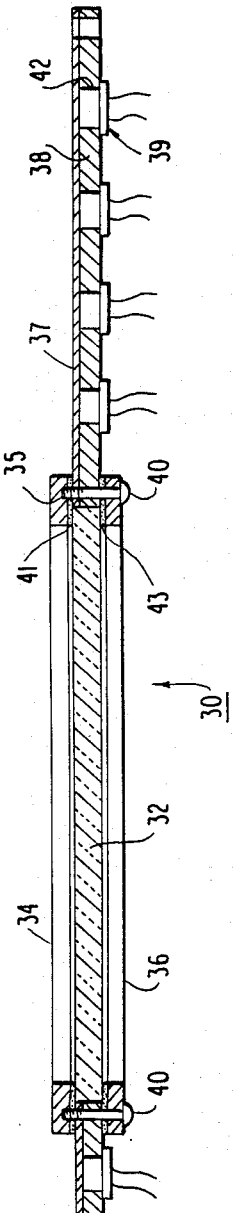

EXPLOSION-PROTECTED COMPUTER TERMINAL

BACKGROUND OF THE INVENTION

1. Field of the Invention

The invention relates to a computer and display device which can be used in a hazardous (explosive and/or corrosive) environment for the input and output of operator and computer initiated data.

2. Description of the Prior Art

Computer control of processes producing or using explosive and/or corrosive gases, vapors, dusts, or liquids is currently accomplished by remotely locating the computer and/or display device in a control room situated in a non-hazardous area. This unnecessarily limits operator interaction with the process and creates system hazards since the operator can no longer see, hear, feel, or smell the process machinery or products. It has been industry's desire to have commercially available a computer and/or display device which would be certified safe for use in explosive/corrosive atmospheres, thereby placing the operator and the computer and display device directly at the process site. For the purposes of this disclosure, the computer and display device shall be referred to as a terminal.

To applicant's knowledge, no certified complete explosion-resistant process instruments or computer terminals are presently available. The user group, company, corporation, etc. normally assembles special instrumentation from a collection of previously qualified and certified components (for this disclosure consider the qualifying agent as Factory Mutual Research Corporation, Underwriters Laboratories or other nationally or internationally recognized certification agency). In that a computer terminal is a highly sophisticated device, no user group attempted to package or modify a device for hazardous environments.

Certain severe limitations immediately are evident. An explosion proof casting of sufficient volume to house a computer terminal would be too large and heavy to transport. The viewport or window in the explosion proof container would be very large and costly, and the thickness of the window would cause distortion when viewing the display. No effective means are currently available for operator data entry, i.e. a operator keyboard. The terminal must be protected from the environment, i.e. explosive/corrosive type substances and process-generated heat. The explosive process environment must be protected from the effects of the terminal, i.e. electrically generated sparks, excessively hot components, and static-generated discharges from the operator to the terminal, or from the CRT display (picture tube).

Plastic or rubber membrane keypanels have been refused certification because of their puncture susceptibility and the resulting possible erratic operation caused by exposed or corroded key contacts. Sealed key switches, per se, for use as data entry devices are already known in the prior art. For example, U.S. Pat. No. 4,339,634—Weber discloses a full travel rubber-gasketed switch which, however, could not be used in a hazardous environment because it could easily be punctured and also easily disabled or destroyed by corrosive agents. U.S. Pat. No. 3,383,487—Wiener discloses a two-part sealed metallic contact switch activated by deforming a plastic membrane by finger pressure or by electromagnets. Such technology could not be used in a hazardous environment since the contacts, though sealed, could cause sparking if the plastic membrane were punctured. Though mention was made of a sealed switch being acceptable in an explosive atmosphere, no certification of this type device has been found. This also pinpoints a common fallacy in much of the art in that an assumed or implied use in an hazardous explosive environment is made, whereas the only acceptable terminology is "Certified for Use in Explosive Environments" by some nationally or internationally recognized agency. U.S. Pat. No. 4,296,406—Peason describes a switch making use of variable resistance technology. This type of switch is inherently spark free; however, it still employs a flexible mylar (plastic) sheet which could be punctured, thereby creating an electrical safety hazard. Large areas of plastic, such as are required for alphanumeric keyboards, are subject to static electricity discharges. U.S. Pat. No. 4,066,853—Zenk describes a plastic membrane panel used in a matrix configuration comprised of conductive strips coated with a piezoresistant coating. Again, the panel is restricted to non-hazardous uses since it is easily punctured. International Publication Number W081/02223—Kroeger and Norquist also describes a flexible membrane pressure-sensitive type piezoelectric matrix keyboard. This design suffers from the common faults of (1) a plastic membrane which is easily punctured and (2) interaction between switches caused by the use of common subtrates for all switch or pressure points.

SUMMARY OF THE INVENTION

It is the object of this invention to provide for such a computer terminal housed in a Type X purged and/or liquid-cooled, easily transported explosion-protected and corrosion-proof enclosure for use in a hazardous location, as defined by the National Fire Protection Agency.

It is a further object of this invention to minimize the number and complexity of components housed in a compact explosion protected control box.

A further object of this invention is to provide such an enclosure with a completely safe and certifiable data entry panel (keypanel) which is completely impervious to accidental mechanical penetration and spills of corrosive substances and which is also able to withstand the internal pressures required for Type X purging. The design of this keypanel is paramount to receiving official certification.

A more specific object is to provide such an enclosure with a keypanel, including the CRT viewport, which is electrically conductive to prevent the accumulation of static charges which would produce dangerous spark discharges.

These objects are achieved according to the invention through use of multiple housings each characterized by a specific application which leads to a specific implementation. A control box functions as the terminal purge initialization device and contains all the relay logic to effectively control the terminal and associated purge and/or cooling devices. All components located within or through the walls and/or cover of the control box are solid state, or hermetically sealed, which greatly reduces the possibility of sparks igniting the corrosive/explosive substances. The control box itself is certified explosion proof, thereby providing a doubly protected initialization feature. A series of four illuminated combination pushbutton/light indicators are located on the cover of the control box. When the terminal and all purge and cooling circuits are operating properly, all four lights on the control box will be illuminated. Any system failure or light failure will be immediately evident to the operator. The terminal will automatically start a shut down procedure should any sub-system, e.g. purge, cooling or primary AC power, go into failure mode.

The computer terminal enclosure is configured for Type X purge. Type X purge requires that a positive pressure be maintained within the enclosure after four enclosure volumes of clean dry air or inert gas have been expelled. The terminal enclosure houses the computer terminal, valving and a pressure sensor for the purge feature, a thermostatic control for the internal cooling radiator and fan if used, and a moisture-detection circuit to automatically shut off the AC power in the event of a cooling water leak. All purge valves are of the normally open configuration for providing a positive purge in the event of a power failure. Under normal operation the terminal housing is first purged, then pressurized to eliminate the need for large quantities of air or inert gas. The only openings in the enclosure are for purge and/or cooling water inlets/outlets; modem (communication) input/output port 46; intrinsically safe power port 45 to the purge control valves; primary AC power port 47 to the computer terminal and ancillary cooling and purge controls.

These openings are all ½ inch or less National Pipe Thread Fittings. The terminal enclosure is fabricated from aluminum or stainless steel as determined by application. All seams are welded to provide both maximum structural integrity and also minimum leakage of purge air or inert gas. The entire front of the terminal enclosure is composed of a keypanel and CRT viewport. The viewport is made of ¼ inch thick conductive safety glass or ¼ inch thick polycarbonate with conductive front and side surfaces. The viewport or window must be conductive to prevent any static from being generated by the CRT tube or by wiping with a gloved hand. The keypanel employs a proven technology of individual piezoelectric key switches. To eliminate any potential failure mode brought on by accidental forces, the panel is fabricated from a single ¼ inch thick rigid aluminum plate. The plate is bored to form recesses each of which accepts a completely encapsulated piezoelectric switch. Cemented to the face of the ¼ inch thick aluminum plate is a 1/64 inch thick flexible deformable stainless steel plate which acts as a conductive and corrosion-resistant operator input panel. Alphanumeric or special legends may be engraved or printed on this plate in a pattern consistent with the previously described piezoelectric crystal assemblies. The crystals are sensitive to direct or gloved pressure and are connected to one of the many commercially available voltage-or current-sensing circuits and/or devices. The rigidity of the ¼ inch plate eliminates any interaction between switches. All switches are both physically and electrically independent and share no common substrates or other fabrication techniques normally associated with multi-key applications. To aid in operator feedback, a light-emitting diode is illuminated at the bottom of the viewport, and an internal buzzer is sounded each time a pressure point or "key" is touched.

The invention further includes any monochrome or color alphanumeric and/or graphic terminal or stand-alone computer such as, but not limited to, personal and industrial computers and displays enclosed within a sealed, purged and/or cooled housing making use of a solid state non-intrusive keypanel and certified for use in explosive and/or corrosive environments defined as Class I and II Division 1 and 2 of the National Electric Code, using a Type X purge.

BRIEF DESCRIPTION OF THE DRAWING

FIG. 1 is a perspective view showing the hardware organization of the preferred embodiment of the terminal and showing a diagram of the front panel of the terminal.

FIG. 3 is a cross-sectional view of the front panel of the terminal.

DESCRIPTION OF THE PREFERRED EMBODIMENT

Figure 2:
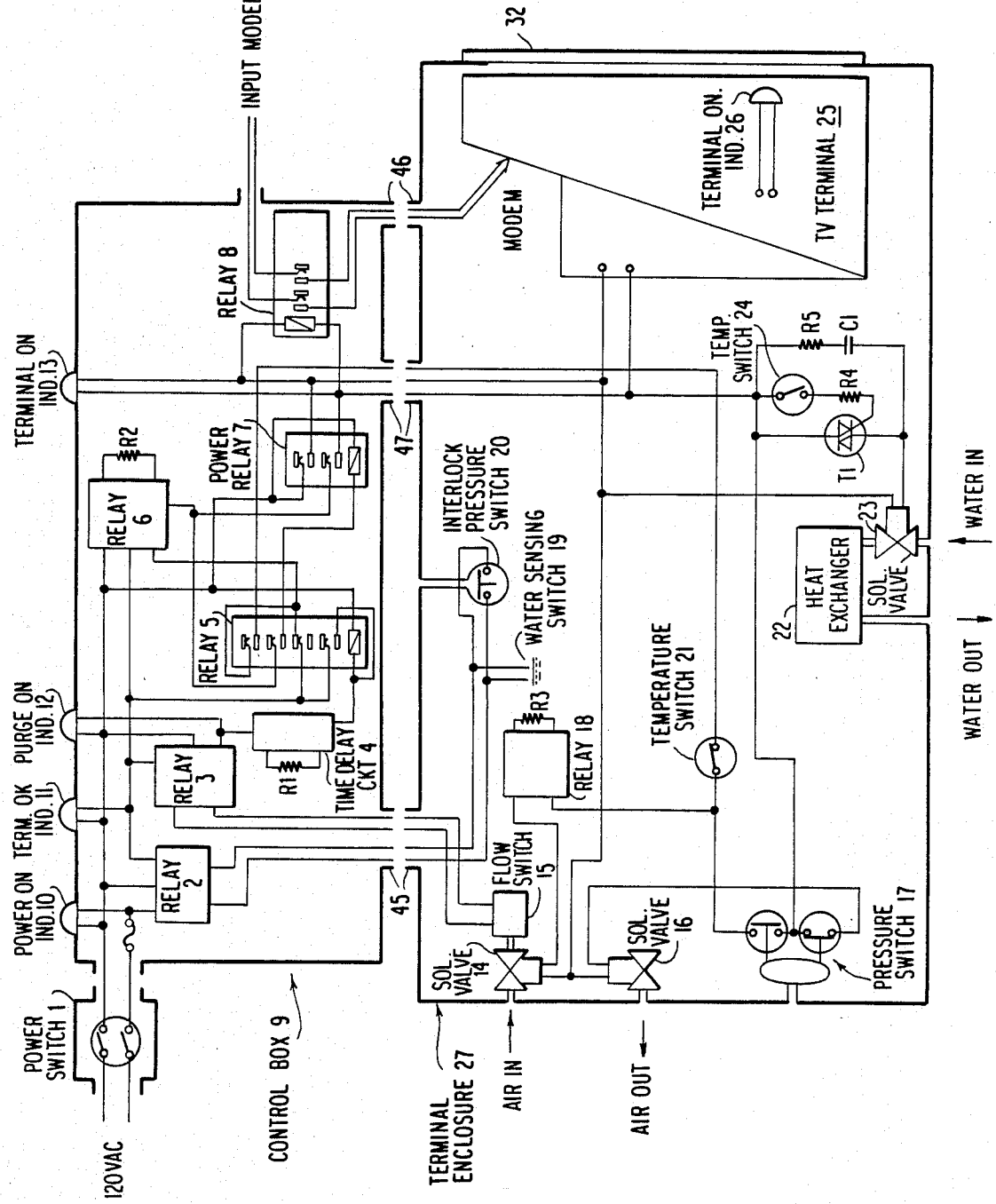
FIG. 2 is a schematic diagram of the electrical pressure, power and cooling circuits of the terminal.

FIG. 1 shows the two mechanical housings comprising a complete terminal. The control box 9 is an explosion-protected casting and contains all the control circuits for terminal purge and AC power initiation. The terminal enclosure 27 is a rugged welded structure containing the computer terminal, purge and/or cooling valves, and a unique seamless stainless steel keypanel with an electrically conductive visual display viewport. This combination keypanel/viewport is one of the critical elements in this embodiment. Electrical connectors between enclosures 9 and 27 are supplied by the user and must be suitable for use in hazardous locations. The terminal enclosure 27 is also connected to a source of clean dry air (inert gas) and cooling water, if required.

The electrical protection circuit incorporated in the computer terminal is designed to start and keep the terminal running safely in a hazardous environment and to protect the terminal from overheating due to external heat sources. Special sealed relays and switches are used, as well as an outside source of inert gas or clean dry air. The requirements for NFPA Type X Purging specify that at least four volumes of purge gas or clean dry air must pass through the enclosure while maintaining an internal pressure of at least 0.1 inch of water prior to applying power to the terminal. After the purging cycle is complete, the internal circuitry and components maintain a safe pressure and temperature within the enclosure. Any loss of primary electrical power, purge gas or air or high temperature will cause the terminal to shut down to a non-powered, safe condition.

With reference to FIG. 2, power is first supplied to power switch 1 which is also explosion-protected. The power switch supplies power to an intrinsically safe solid state relay 2. This relay is used as a water sensor and interlock. The water-sensing switch 19 and interlock pressure switch 20 are located inside of the sealed terminal enclosure 27. The "switch" side of relay 2 is acceptable for use in hazardous areas without a protective enclosure. In the case of water being present, or the sealed enclosure being open, power will not be supplied to the rest of the circuit. Relay 2 is normally closed; thus, if the switch circuits 19 and 20 of relay 2 are open, as they are for normal operation, power is supplied to the next solid state intrinsically safe relay 3 and a relay 6. Relay 3 controls the purge system. The "switch" side of relay 3 is connected to flow switch 15 located in the sealed enclosure 27; relay 3 is normally open. Relays 2 and 3 may be model numbers 25872 and 22445, respectively, of Transamerica Delaval, Inc.

Relay 6, which is the "delay power on dropout", controls the pressurizing of the terminal enclosure 27. This relay, though energized, will not supply power to the terminal until the time delay circuit 4 energizes the coil of relay 5. Relay circuit 4 is set for a 20 minute delay using resistor R1. The timing period begins when the flow switch 15 first indicates flow. Opening of the flow switch during the timing period resets the timer to zero.

The two solenoid valves "Air In" 14 and "Air Out" 16 are normally open, and purge can be completed without supplying any electrical power (except intrinsically safe level) to the terminal enclosure 27. Also, even during the initial purging time or normal operation, an indication of water (moisture) presence (sensor 19) or enclosure opening (interlock 20) will cause an immediate power shutdown.

After the initial purge cycle is completed, relay 5 will set to a stable "on" position, and resetting is possible only by turning off the power switch 1. This interlock prevents a repeat of the purging cycle in the case of momentary failures or interruptions of the pressurizing system during normal operation.

Relay 5 energizes power relay 7 which supplies power to the terminal. Simultaneously, relay 8 is also energized, and the modem input is connected to the terminal. All mechanical relays contained within the explosion-proof control box 9 are hermetically sealed.

During the initial purging cycle, static pressure inside of the enclosure 27 is between 0.5 to 1.0 inch of water (measured); this is lower than the setpoint of the low pressure switch 17 (3 inches of water) which is higher than the minimum requirements (0.1 inch of water) for this class operation. After the purge cycle is completed, and power is supplied to the circuits inside of terminal enclosure 27, high pressure switch 17 will close the solenoid valve 16, and the enclosure will be pressurized and valve 14 will remain open. When the internal pressure exceeds 3 inches of water, relay 18 is energized and, after an adjusted time delay of 4 seconds as set by resistor R3, the inlet valve 14 will also be closed. (The measured positive pressure inside is about 8 inches of water.) The high set pressure switch 17 guards against over pressurization of the terminal. This sequence initiates normal operation of the terminal.

If the pressure inside the terminal 27 drops below the setpoint of the low pressure switch 17, the solenoid valve 14 will be de-energized and open. The terminal 27 will be pressurized again, thereby operating the switch of relay 6 which can be open during a 10 second interval set by resistor R2 without de-energization of the power circuit inside of the terminal enclosure 27. If, during this 10 second interval the pressure does not build up above 3 inches of water, the terminal will automatically shut down.

The terminal enclosure is also equipped with temperature protection circuits. Temperature switch 21 prevents energizing the terminal if the inside temperature is higher than 45 degrees C. (113 degrees F.), if required by the environment, and temperature switch 24 controls the solenoid valve 23 to control the water supply to the heat exchanger 22. This switch 24 is set to turn on at 30 degrees C. (86 degrees F.). A Triac T1 is used to prevent overloading of the switch 24.

Light indicators located on the control box 9 are used to inform the user about the status of the computer terminal. Indicator 10 (green) when illuminated, indicates that power switch 1 is turned on and that power is available to the control box 9. Indicator 11 (green), when illuminated, indicates that there is no water present and the enclosure is closed. Indicator 12 (green), when illuminated, indicates that the purged system is functional, and indicator 13 (green), when illuminated, indicates that power is supplied to the terminal enclosure 27. All four indicators are explosion-proof. Indicator 26 is located in the computer terminal enclosure 27 and is visible through the CRT viewport. It indicates that the computer terminal is operational and can be helpful in troubleshooting of the system.

It should be noted that all indicators are illuminated during normal operation. Any system malfunction can be rapidly isolated through use of these indicators.

FIG. 3 is a diagram of the front panel of the sealed purged computer terminal enclosure. Many configurations were reviewed prior to designing the preferred embodiment of the terminal front panel. These configurations were typically chosen for, but not limited to, meeting or exceeding all applicable National Electric Codes (NEC), National Electrical Manufacturers Association (NEMA) Standards. As previously stated, a casting to house a computer terminal would be prohibitively large and heavy. A means to enter data via "switches" presented a host of problems. A one inch "smother path" is required for all rotary or plunger activated switches going through the case.

A computer terminal could typically require 75 (or more) keys (switches) for operator data entry. This would require, in the housing, 75 (or more) holes that, in turn, would weaken the housing to the point of being unacceptable. Any controls going through the case would be subject to corrosion and would require constant maintenance. The return spring pressure for this type of activator would be too great for normal finger-activated data entry. Commercially available explosion-proof switches could be used; however, these switches are physically too large and would require approximately 1600 square inches of panel space.

The keypanel implementation of the preferred embodiment shown in FIG. 1 consists of three major components. A structurally sound and rigid ¼ inch metal plate 30 which effectively seals the front of the terminal enclosure, a clear electrically conductive viewport 32 providing viewing of the internal graphic display, and a series of touch-sensitive points 31 organized as an operator data entry keypanel. Plate 30 is sufficiently rigid to form an effective seal against the terminal enclosure 27. A series of screws 33 are sequentially tightened to form a leakproof seal against the front edge of the terminal enclosure. The viewport 32 may be conductive safety glass or polycarbonate (such as General Electric Co.'s LEXAN) with an applied conductive clear coating. Either of these viewports must be of sufficient thickness and strength to withstand an internal pressure of 15 pounds per square inch without permanently deforming or rupturing. The conductive coating is connected to an electrical chassis (earth) grounding point to eliminate any static build-up (and subsequent discharge) from wiping the viewport with a gloved hand or other type cleaning cloth, or from the CRT display. A rigid frame 34 compresses the viewport against a resilient sealing material to effectively maintain a leakproof seal and structure. All fastening devices securing the frame 34 to the panel 30 are inserted from the reverse side, thereby minimizing through holes which are possible pressure leakage points. The touch-sensitive points 31 are aligned over a grouping of fully encapsulated piezoelectric type sensors which are inserted into blind holes on the reverse side of panel 30. Use of encapsulated piezoelectric sensors eliminates all problems associated with membrane switches, such as accidental puncturing by outside sources or rupturing due to internal computer terminal pressurization. Mechanical switches would also lead to extensive problems relative to pressure sealing and corrosion. FIG. 3 illustrates the preferred embodiment of the front panel assembly 30 of the terminal enclosure. A ¼ inch thick metal plate 38 is the primary support for the front panel assembly. Recesses 42 are fabricated into plate 38 to receive switch assemblies 39. These switch assemblies are piezoelectric devices, such as those made by KDC Corp., drawing No. 10182. All switch assemblies are the same and may be connected in any convenient matrix for decoding. The switch assemblies are entirely encapsulated, thereby eliminating any possibility of contamination. A property of piezoelectric devices fabricated from one substrate is "cross-talk" or interference between adjacent touch points brought about by stress or stretching of the common flexible substrate. This invention eliminates this problem through the use of individually encapsulated switches inserted in a panel which has a rugged and rigid support structure between switches. Touching any point, other than in the area directly over a switch, causes no stress and, thus, no electrical output from that switch. A stainless steel deformable overlay 37 provides for the necessary corrosion resistance required in some processes. This overlay 37 can be engraved with the desired legends or may be coated with conductive inks or epoxies. It is imperative that the front surface of the keypanel be conductive to eliminate static discharges caused by wiping. The overlay 37 is affixed to the plate 38 with an industrial adhesive. The conductive viewport 32 is of the same thickness as the plate 38 plus overlay 37. The viewport is held in place by two metal compression frames 34 and 36. Frame 34 has inwardly opening blind holes threaded to accept a series of screws 40, thereby eliminating through holes which could be a source of leakage into or out of the enclosure. Frame 36 has a matching set of through holes and acts as the internal compression frame. An industrial adhesive is applied to all mating surfaces 41 and 43 of frames prior to assembly. The conductive viewport 32 is grounded to plate 38 by virtue of the mechanical contact therewith around the edges of the viewport.

The term "sealed" used herein with reference to the computer terminal enclosure and its components parts—not limited to but including the terminal housing and keypanel/viewport assembly—is intended to indicate that the terminal enclosure will prevent permeation of explosive gases, vapors, liquids or dusts into the housing 27 when the required inert gas or clean dry air purge is present.

The terminal enclosure 27 and control box 9 are particularly suited for enclosing electronic devices, such as computers, visual displays and CRT devices where effective exclusion of corrosive/explosive substances is critical to the operation of the device. Instead of a CRT display, one could use an LCD, LED, Electroluminescent, fluorescent or pPlasma display.

While a preferred embodiment of the invention has been described in this specification and illustrated in the drawing, it is to be understood that the scope of this invention is limited only by the following claims which cover the preferred embodiment and also equivalents and obvious variations thereof.

We claim:

1. An explosion-protected and corrosion-proof computer terminal comprising:
    an electrically grounded, corrosion-proof, sealed and pressurized metal enclosure formed by a plurality of metal wall panels and a front panel;
    said front panel being hermetically sealed to, and in electrical contact with, said enclosure and comprising a metal plate, and a transparent electrically conductive window hermetically sealed in an opening in said metal plate which is in electrical contact with said window;
    an electric display disposed within said enclosure and located adjacent said window, whereby any static electrical charges generated on said window are shunted to ground without any sparking; said metal plate being rigid and having a plurality of apertures therein;
    a pressure-sensitive semiconductor switch assembly mounted within each of said apertures;
    a deformable electrically conductive metal sheet secured to said rigid metal plate in intimate contact therewith and covering said plurality of apertures;
    disposed within said enclosure, a water heat exchanger for cooling the interior of said enclosure, purging gas control valves for purging and pressurizing said enclosure, a temperature sensor for sensing the temperature in said enclosure, a pressure sensor for sensing the pressure of said gas, and a moisture sensor for sensing the moisture in said enclosure; and
    control circuit means, responsive to said temperature, pressure and moisture sensors, for electrically deactivating the terminal when temperature, pressure and moisture within the enclosure are sensed to be at other than predetermined safe levels.

2. The computer terminal as defined in claim 1 wherein said enclosure contains a plurality of port means providing conduits for electrical conductors interconnecting said control circuit means with said temperature, pressure and water sensors.

3. The computer terminal as defined in claim 2 further comprising an explosion-proof control housing in which said control circuit means is disposed.

4. The computer terminal as defined in claim 1 wherein said display is a CRT display.

* * * * *